RECORD DISCHARGING MECHANISM FOR AUTOMATIC PHONOGRAPHS

Filed March 11, 1950

2 Sheets-Sheet 1

INVENTOR.
JOHN A TOURTELLOT
BY
Brown, Denk & Synnestvedt
AGENTS

INVENTOR.
JOHN A. TOURTELLOT
BY
Brown, Denk & Synnestvedt
AGENTS

Patented Apr. 27, 1954

2,676,805

UNITED STATES PATENT OFFICE 2,676,805

RECORD DISCHARGING MECHANISM FOR AUTOMATIC PHONOGRAPHS

John A. Tourtellot, Merchantville, N. J., assignor to Philco Corporation, Philadelphia, Pa., a corporation of Pennsylvania Application March 11, 1950, Serial No. 149,157

5 Claims. (Cl. 274—10)

The present invention relates to automatic phonographs and, particularly, to automatic record changers in which provision is made to support a stack of records above the turntable and to feed the records successively onto the turntable. More specifically, the invention has to do with that kind of record supporting and feeding arrangement which utilizes a non-rotatable shouldered spindle adapted to support the center of a stack of records, a shelf structure adapted to support the edge of the stack, and mechanism to effect release of the lowermost record so that it drops from a supported position to a playing position upon the turntable.

It is the primary object of this invention to provide an arrangement of the above mentioned general variety, which is constructed and operated in an improved and novel manner. The improved and novel construction and operation of the arrangement makes it possible to eliminate the use of intricate slide and pusher means which are ordinarily associated either with the shelf structure or with the spindle to cause successive discharge of the stacked records from their support.

It is also an object of the invention to construct the record supporting and discharging arrangement in such a manner as to avoid the constructional and operational difficulties and problems which have heretofore arisen from the fact that the arrangement must be capable of adjustment to accommodate records of different standard sizes or diameters.

Another and more specific object of the invention resides in an arrangement wherein the non-rotatable central spindle itself serves as the main element to effect release of the lowermost record in the stack. The arrangement is such that operation of the spindle to release records is accomplished without having to move the turntable from its normal operating position. This adds to the simplicity of the phonograph apparatus and insures the adequateness of its operation.

In accordance with the present invention the above stated general objects are advantageously obtained by providing a non-rotatable shouldered spindle which is mounted centrally of the turntable and which, during a record changing cycle is adapted to move bodily in relation to the turntable and to the record edge supporting shelf structure arranged in a fixed position to one side of the turntable. The movement of the spindle is in a direction generally radial with respect to the axis of the turntable and toward and away from the confronting edge of the side shelf structure.

The record engaging portions of the spindle and of the shelf structure are so constructed that movement of the spindle so displaces the records as to free the lowermost record for dropping into playing position on the turntable. The spindle is moved by a simple lever-and-cam system adapted to function during a record changing cycle. The lever-and-cam system includes means which effectively assist is rigidly holding the spindle in proper position to center the records during playing, and which also effectively serves as safety means adapted to permit yielding of the mechanism in the event of interference with the normal movement of the records.

The full nature of the invention will be more clearly understood from the following detailed description based on the accompanying drawings which illustrate a practicable embodiment of he invention. In these drawings.

Figures 1, 2:
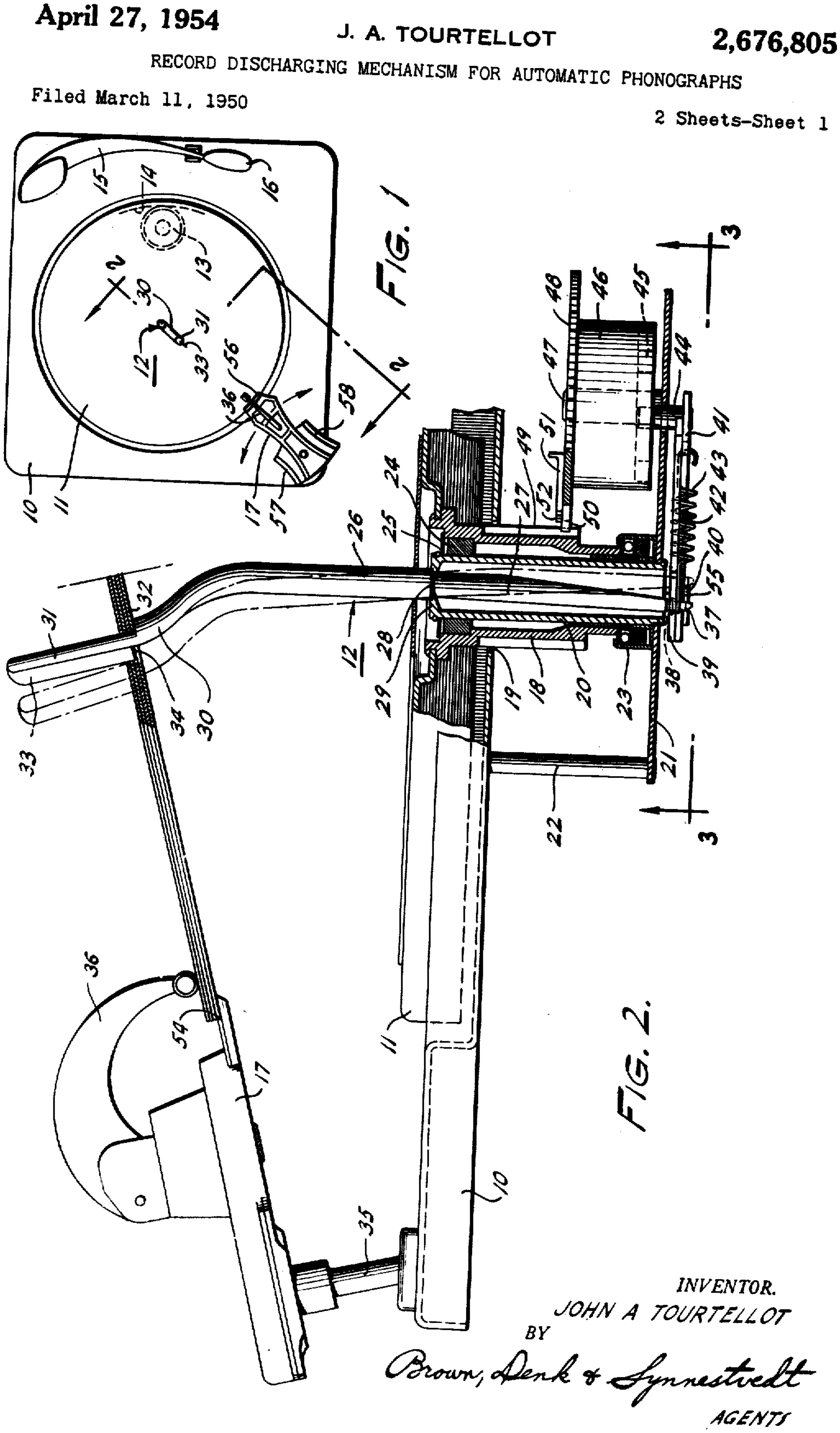
Figure 1 is a top plan view of an automatic phonograph incorporating the invention.
Figure 2 is an enlarged elevational sectional view looking in the general direction of arrows 2—2 of Figure 1.

With more particular reference to the drawings, Figure 1 illustrates the essential parts of one form of phonograph to which the invention is applied. As shown, the phonograph includes a base plate or supporting panel 10 which serves to carry the various parts. A turntable 11 is rotatably supported by the panel and is adapted to hold records during the playing thereof. A central spindle generally indicated at 12, serves to center the records and retain them on the turntable. The turntable is driven, at proper rotational speed, by means of the customary motor (not shown), which drives an idler 13 in frictional engagement with depending flange 14 of the turntable. A tone-arm 15 is mounted on the supporting panel for movement both horizontally and vertically relative to the turntable. The tone-arm carries a suitable pick-up 16 having the usual needle (not shown) which is adapted for engagement with the record groove.

As previously mentioned the phonograph is of the type in which a stack of records is supported above the turntable, and the records are fed successively to the turntable. To that end, as is more clearly shown in Figure 2, the stack of records to be played is supported by the central spindle 12 and by a shelf structure 17 which is arranged in predetermined position on one side of the turntable. In the embodiment illustrated the turntable is provided with an axially disposed tubular hub 18 which passes through an opening 19 in mounting panel 10 and which is concentric with and rotatable on an upright tubular axle 20. This axle is fixedly supported on a bracket or bridge 21 which is rigidly suspended from mounting panel 10 as by means of posts, such as the one illustrated at 22 in Figure 2. The lower extremity of the turntable hub rests on ball-race bearing 23 arranged about axle 20 and retained on bracket or bridge 21. A side bearing 24 is advantageously provided between turntable hub 18 and axle 20, at their upper end portions, to insure stabilization of the turnable during its rotation about said axle. Accidental removal of the turntable from axle 20 is prevented by suitable retaining means 25 conveniently disposed above side bearing 24 at the upper portion of said hub and axle.

As also shown in Figure 2, the spindle is provided with a straight portion 26, the lower part of which is received in the tubular axle 20. This lower part of the spindle has a section 27 which is reduced in diameter to provide a ridge 28 resting on a generally annular flange 29 on said axle. The spindle is also provided with a curved or bent portion 30, the upper part of which terminates with an offset extension 31 providing an inclined shoulder 32. This extension is supplied with a side piece 33 disposed to provide a second shoulder 34 which normally lies in a position opposite that of shoulder 32 and above the latter at a distance slightly greater than the thickness of a record. The length of the spindle extension 31 which projects above shoulder 32, is sufficient to accommodate the stack of records to be played, and the cross-sectional diameter of extension 31 and associated piece 33 is such that said extension and piece fit in the central opening of the records in the supported stack.

The shelf structure 17 is mounted on a standard 35 suitably arranged on the supporting panel 10. It is to be noted that the shelf is supported at a level between the turntable and the spindle shoulder 32, and that the record supporting surfaces of the shelf and shoulder are slanted upwardly in the same direction and are disposed substantially in the same inclined plane. It is also to be noted that the mounting of the spindle is such that its curved or bent portion 30 leans toward the shelf, that the shelf and spindle carried piece 33 face each other, and that the spindle shoulder 32 faces away from the shelf. Because of this arrangement the stack of records is supported at an angle with respect to the record supporting surface of the turntable, and the upper offset extension 31 of the spindle engages that peripheral edge portion of the record center hole which is farthest from the shelf. A pivotal holder 36 is provided on the shelf structure to bear upon the record stack thus maintaining the records firmly on the supporting surfaces. By supporting a stack of records in the above described fashion, adequate retention of the records in supported position is assured, and proper discharge of the lowermost record, in accordance with the invention, is obtained.

As hereinbefore indicated, in the arrangement according to the invention, the lowermost record is released from the suspended stack by movement of the central spindle 12 in a direction generally radial with respect to the axis of the turntable and toward and away from the confronting edge of shelf structure 17. For that purpose, the tubular axle 20 which mounts the turntable and supports the spindle, has an internal diameter such as to permit free rocking movement of the spindle about the pivot provided by engagement of the spindle ridge 28 with axle flange 29. Movement of the spindle takes place during a record changing cycle and is controlled by means of the lever-and-cam system which is illustrated in Figures 2, 3 and 4.

As seen in these figures, the lower extremity of the spindle projects below the axle 20 and through the bracket or bridge 21 and terminates with a semi-circular extension 37 which snugly fits within a semi-circular aperture 38 in one end portion of a lever arm 39. It will be understood that the extension 37 and aperture 38, because of their semi-circular shape, cooperate to insure proper positioning of the spindle with respect to the shelf structure. The other end portion of lever arm 39 is pivotly retained on a pin 40 which is affixed to and depends from the bracket or bridge 21. A second lever arm 41 has one end portion also pivotly retained on the pin 40. This second lever arm is generally L-shaped and its free end portion is provided with an extended finger 42 disposed to abut the free end portion of the first mentioned lever arm 39 under force of a coil spring 43 which interconnects the two lever arms so that they normally move, as one unit, about pivot pin 40. The arm 41 is provided with a cam follower 44 which engages a cam track 45 conveniently formed in cycling cam 46 of the phonograph.

The cam 46 remains stationary during the playing of a record but undergoes a single complete revolution during a record changing cycle. The cam is rotatably mounted on a stub shaft 47 supported on the bracket or bridge 21 and is provided with a gear 48 adapted to be driven by gear teeth 49 which are advantageously formed on the circumferential surface of the turntable hub. A portion of the gear 48 is recessed and cut away, as at 50, so as to be normally disengaged from the driving gear teeth 49. A segment 51 is movably mounted on the cam gear 48 and has teeth 52 which are adapted to complete said gear and to mesh with said driving gear teeth to initiate rotation of the cycling cam. As is customary, the segment is normally held in retracted position by means of a suitable latch (not shown) and is released for engagement with said driving gear teeth by means of a suitable trip (not shown), which trip comes into operation when the tone-arm reaches the terminal groove of the record being played.

Figures 3, 4, 5, 6, 7:
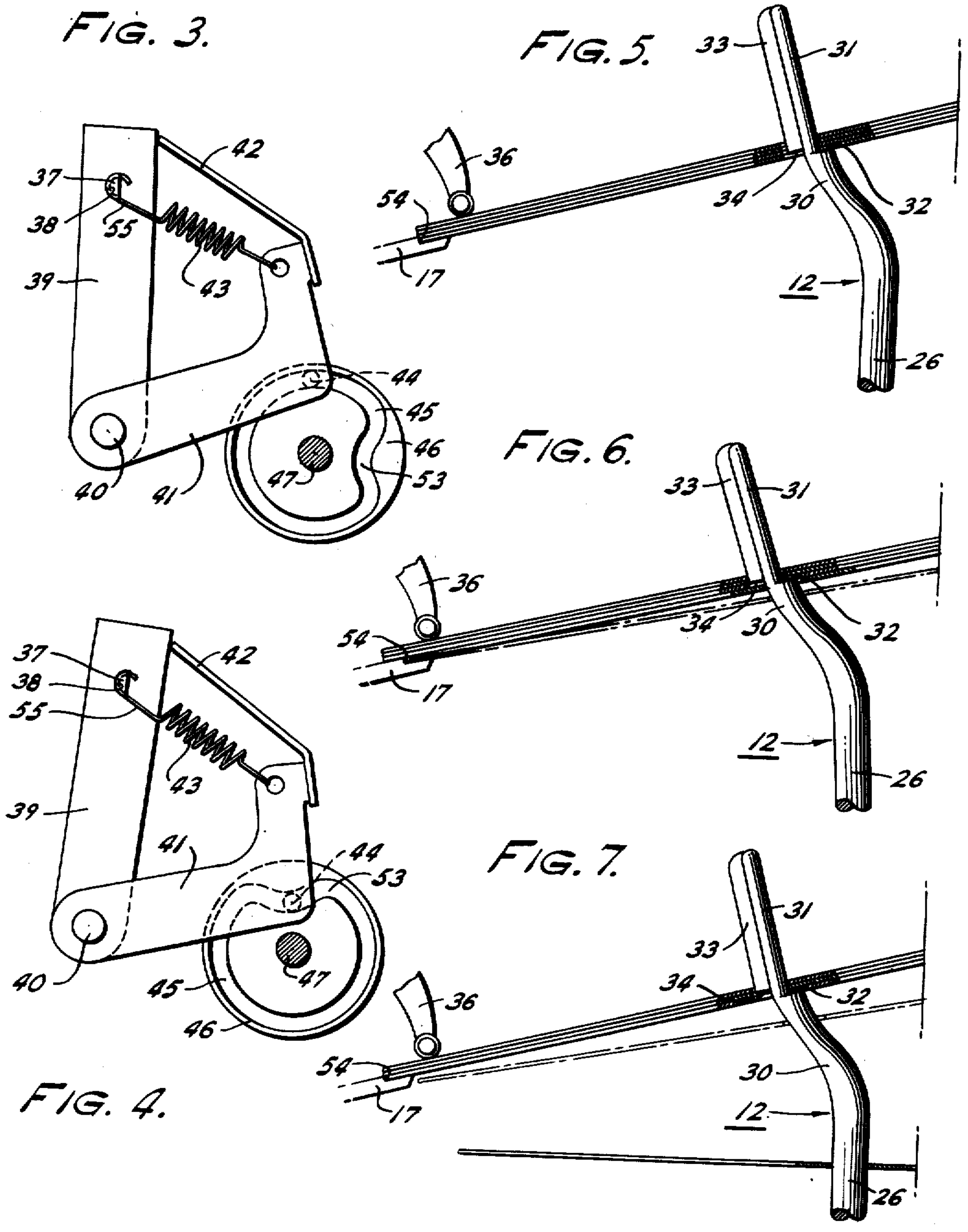
Figure 3 is a fragmentary view looking in the general direction of arrows 3—3 of Figure 2 and illustrating the spindle moving mechanism in one of its positions.
Figure 4 is a view similar to Figure 3 and illustrates the spindle moving mechanism in another of its positions.
Figures 5, 6 and 7 are fragmentary views showing successive positions which the spindle assumes in its movement to release the lowermost record of a supported stack.

As clearly appears in Figures 3 and 4, the cam track 45 has a depressed portion 53 which, during rotation of the cycling cam acts on cam follower 44 to cause the interconnected lever arms 39 and 41 to pivot, first in a clockwise direction from the position shown in Figure 3 to the position shown in Figure 4, and then in a counter-clockwise direction from the position shown in Figure 4 back to the position shown in Figure 3. Movement of the interconnected levers as above described causes the central spindle 12, as is represented in Figure 2, to rock on axle flange 29 between the two extreme positions represented in full lines and in dotted lines, respectively. This rocking motion of the spindle, according to the invention, effects release of the lowermost record in the manner which will now be described with particular reference to Figures 2, 5, 6 and 7.

In Figure 5, the position of the spindle corresponds to the full line position in Figure 2. In this position, it will be seen that the stack of records is suspended at its center by spindle shoulder 32, and at its edge by the shelf structure 17.

In Figure 6, the position of the spindle corresponds to the dotted line position in Figure 2. In this position, it will be seen that the spindle portion engaging those records overlying the lowermost record, has displaced, to the left, all the supported records except the lowermost one which is effectively held against displacement, to the left, by means of a raised ledge 54 provided on the shelf structure and having a thickness substantially equal to the thickness of a record. By thus holding the lowermost record against displacement during movement of the central spindle to the position shown in Figure 6, that is, the position shown in dotted lines in Figure 2, the shoulder 32 of said spindle is brought into registration with the center hole of the lowermost record so that the latter clears and drops to a level below said shoulder.

In Figure 7, the spindle is shown as having been returned to the initial position, that is, the position shown in full lines in Figure 2. In returning to this initial position, the spindle displaces all the suspended records, to the right. The lowermost record is thus completely withdrawn from the shelf structure so that said lowermost record is free to fall until it reaches its playing position on the turntable, and the other records are moved back over the shelf structure ahead of the raised ledge 54 so that the next record which becomes the lowermost one in the stack, is made ready for release during the next succeeding record changing cycle.

Attention is especially directed to the fact that one end 55 of spring 43 is fixedly attached to the spindle extension 37 which passes through the aperture 38 in lever arm 39, so that said spring performs the additional function of assisting in rigidly holding the spindle in proper position to support the records over the turntable, and to center the records on the turntable. Moreover, the provision of spring 43 as the interconnecting link between the two lever arms 39 and 41, permits the spindle actuating mechanism to yield in the event of a jam during a record changing cycle. In other words, should the movement of the spindle toward dotted line position (Figure 2) be interfered with so as to prevent normal movement of the interconnected lever arms, the spring 43 will allow lever arm 41 to pivot independently of lever arm 39 so that no damage can occur either to the mechanism or to the supporting records. It will be understood that, in practice, the spring 43 is such that it yields only when movement of the spindle toward the shelf structure is resisted with abnormal force, and will not yield but, rather, will act as a rigid link when the spindle meets with the normal resistance imposed on said spindle by its engagement with the record stack in sliding the same during a record changing cycle.

In order to adapt the phonograph apparatus for use with records of different diameters, the record edge supporting structure 17 is arranged to be manually rotated on its mounting standard 33 and is provided with a plurality of shelf portions, such as shown at 56, 57 and 58 in Figure 1. These shelf portions are disposed to extend radially of said standard so that, by rotating the record edge supporting structure, any one of the shelf portions may be placed in confronting relationship with the central spindle. It will be noted that the shelf portions extend to different distances from the mounting standard 33 so that each shelf portion, when placed in confronting relationship with the central spindle, will lie at a predetermined distance from said spindle. Because of this arrangement, it will be understood that by selecting the proper shelf portion to confront the spindle, records of different diameters can be accommodated on the record support. In the embodiment shown in the drawings, the record holder 34 is mounted to swing on the shelf structure so as to be selectively brought into cooperative relationship with that shelf portion which is employed to accommodate the records being used.

From the foregoing description, it will be appreciated that an arrangement constructed in accordance with the invention, is most effective to insure the adequate support of a stack of records over the turntable as well as the proper successive discharge of the records from the supported stack to playing position on the turntable. The efficiency and reliability of the arrangement is enhanced by the fact that the invention makes it possible to reduce to a minimum the number of operative parts which are necessary to accomplish the record supporting and discharging functions of the automatic phonograph. Moreover, the dependability of the arrangement is assured due to the simplicity of construction and operation which result from the provision of a structure whereby the central spindle is moved radially of the turntable and toward and away from the record edge support at the side of said turntable, so that said spindle constitutes the main element which effects discharge of the lowermost record from the supported stack.

I claim:

1. An automatic phonograph apparatus comprising a turntable, a shouldered spindle extending from the center of the turntable to support a stack of records at its center, a shelf structure mounted to the side of the turntable to support the stack of records at its edge, means mounting said spindle for pivotal movement with respect to the turntable and toward and away from said shelf structure, stop means provided on said shelf structure and engageable with the periphery of the lowermost record to prevent its edgewise displacement in response to movement of the spindle toward said shelf structure, a cycling cam, a pair of lever arms, one connected to said cam and the other connected to said spindle, and means interconnecting the lever arms so that they may be moved together by said cam to pivot the spindle first toward and then away from the shelf structure thereby first freeing the shoulder of the spindle from the center of the lowermost record and then withdrawing the latter from the shelf structure, said means including a yieldable link between the lever arms to allow movement of the cam-connected lever arm independently of the spindle-connected lever arm when interference with the normal pivotal movement of the spindle occurs.

2. An automatic phonograph apparatus comprising a turntable, a spindle projecting from the center of said turntable and having a shoulder adapted to support phonograph records adjacent the central opening thereof, said spindle also having a portion extending above said shoulder for passing through the central opening of a stack of records, a shelf mounted to the side of the turntable and having a portion adapted to support phonograph records adjacent the marginal edge thereof, a support located substantially in the plane of the turntable and mounting said spindle for tilting movement substantially radially of said turntable, a connection engaging said spindle and holding it in a predetermined position with respect to said shelf, means including said connection for tilting said spindle on said support and toward said shelf thereby slidably displacing the supported records over said portion of said shelf, and a stop fixed on said shelf to engage the supported lowermost record and restrain it against said displacement so that said spindle, in tilting toward said shelf, brings said shoulder into registration with the central opening of said lowermost record.

3. An automatic phonograph apparatus as set forth in claim 2 in which the mentioned shelf is mounted for rotatable adjustment about an axis substantially paralleling the plane of said spindle and includes a plurality of radially extended record-edge engaging portions adapted, upon said adjustment of said shelf, to be selectively placed to confront said spindle, each of said portions, when so placed, lying at a predetermined distance from said spindle to accommodate records of a certain diameter.

4. An automatic phonograph apparatus comprising a turntable, a spindle projecting from the center of said turntable and having a shoulder adapted to support phonograph records adjacent the central opening thereof, said spindle also having a portion extending above said shoulder for passing through the central opening of a stack of records, a shelf mounted to the side of the turntable and having a portion adapted to support phonograph records adjacent the marginal edge thereof, a support located substantially in the plane of the turntable and mounting said spindle for tilting movement substantially radially of said turntable, a lever arm engaging said spindle and holding it in a predetermined position with respect to said shelf, a cycling cam in engagement with said arm and operable to move the latter for first tilting said spindle on said support and toward said shelf and then returning said spindle to said position thereby slidably displacing the supported records over said portion of said shelf, and a stop fixed on said shelf to engage the supported lowermost record and restrain it against said displacement in response to said tilting of said spindle so that said spindle, in tilting toward said shelf, brings said shoulder into registration with the central opening of said lowermost record thereby allowing the latter to drop below said shoulder so that said spindle, in returning to said position, withdraws said lowermost record from said shelf.

5. An automatic phonograph apparatus comprising a turntable, a hollow axle on which said turntable is rotatably mounted and having an end portion terminating substantially in the plane of said turntable, a spindle extending through said axle and projecting above said turntable, said spindle having a portion engaging said end portion of said axle for tilting movement substantially radially of said turntable, a shoulder on said spindle adapted to support phonograph records adjacent the central opening thereof, said spindle also having a portion extending above said shoulder for passing through the central opening of a stack of records, a shelf mounted to the side of said turntable and having a portion adapted to support phonograph records adjacent the marginal edge thereof, a connection engaging said spindle and holding it in a predetermined position with respect to said shelf, means including said connection for tilting said spindle on said end portion of said axle toward said shelf thereby slidably displacing the supported records over said portion of said shelf, and a stop fixed on said shelf to engage the supported lowermost record and restrain it against said displacement so that said spindle, in tilting toward said shelf, is brought into registration with the central opening of said lowermost record.

References Cited in the file of this patent

UNITED STATES PATENTS

| Number | Name | Date |
|---|---|---|
| 2,343,992 | Morrison | Mar. 14, 1944 |
| 2,453,123 | Erwood | Nov. 9, 1948 |

FOREIGN PATENTS

| Number | Country | Date |
|---|---|---|
| 113,965 | Sweden | May 2, 1945 |
| 64,176 | Denmark | Dec. 17, 1945 |
| 908,650 | France | Apr. 15, 1946 |

Notice of Adverse Decision in Interference

In Interference No. 87,283 involving Patent No. 2,676,805, J. A. Tourtellot, Record discharging mechanism for automatic phonographs, final judgment adverse to the patentee was rendered Feb. 14, 1957, as to claims 3 and 5.
[*Official Gazette April 9, 1957.*]